(12) United States Patent
Zeng et al.

(10) Patent No.: US 6,970,524 B1
(45) Date of Patent: Nov. 29, 2005

(54) METHODS AND SYSTEMS FOR SYMBOL TIMING RECOVERY

(75) Inventors: Huaiyu Zeng, Red Bank, NJ (US); Ye Li, Marietta, GA (US); Jack Harriman Winters, Middletown, NJ (US)

(73) Assignee: AT&T Corp., New York, NY (US)

( * ) Notice: Subject to any disclaimer, the term of this patent is extended or adjusted under 35 U.S.C. 154(b) by 994 days.

(21) Appl. No.: 09/722,498

(22) Filed: Nov. 28, 2000

Related U.S. Application Data

(60) Provisional application No. 60/174,696, filed on Jan. 6, 2000, and provisional application No. 60/169,147, filed on Dec. 6, 1999.

(51) Int. Cl.[7] .............................................. H04B 7/10
(52) U.S. Cl. ...................................... 375/347; 375/371
(58) Field of Search ................................ 375/347, 267, 375/349, 233, 232, 229, 371; 455/137, 138, 139, 140

(56) References Cited

U.S. PATENT DOCUMENTS

| | | | |
|---|---|---|---|
| 5,809,086 A | | 9/1998 | Ariyavisitakul |
| 6,256,340 B1 | * | 7/2001 | Schilling ..................... 375/148 |
| 6,349,112 B1 | | 2/2002 | Shibata |
| 6,452,989 B1 | * | 9/2002 | Friedman ..................... 375/347 |
| 6,466,616 B1 | | 10/2002 | Stenstrom et al. |
| 6,539,067 B1 | | 3/2003 | Luschi et al. |
| 6,560,299 B1 | * | 5/2003 | Strolle et al. ............... 375/347 |

FOREIGN PATENT DOCUMENTS

EP       1 229 697       8/2002

OTHER PUBLICATIONS

Ariyavisitakul, Apr. 1992, IEEE,Journal on Selected Areas of Communication, vol. 10, No. 3, pp. 594–595.*

Duel–Hallen, et al., "Delayed Decision–Feedback Sequence Estimation," IEEE Transactions on Communications, 37 (5), May 1989, 428–436.

* cited by examiner

*Primary Examiner*—Stephen Chin
*Assistant Examiner*—Kevin Kim

(57) ABSTRACT

The present invention provides methods and systems that generate symbol delay times. By receiving a communication signal using a plurality of antennas, a set of respective communication channels can be characterized. The characterized channels can be then used to determine sets of forward-time delays and time-reverse delays using a minimum-mean-square-error technique. By selecting the set of delays that can provide a lower mean-square-error in an equalizer, symbol estimation can be improved as compared to a system that only estimates delays in a single temporal direction.

20 Claims, 7 Drawing Sheets

$\bar{\Phi}_{\text{matrix}}$

Fig. 5

METHODS AND SYSTEMS FOR SYMBOL TIMING RECOVERY

This nonprovisional application claims the benefit of U.S. provisional application No. 60/169,147 entitled "Spatial-Temporal Equalization For EDGE: Enhanced Data Rates For GSM And IS-136 TDMA Evolution" filed on Dec. 6, 1999 and U.S. provisional application No. 60/174,696 entitled "Spatial-Temporal Equalization For EDGE: A Fast Selective-direction MMSE Timing Recovery Algorithm And 2-Stage Soft-Output Equalizer" filed on Jan. 6, 2000. The Applicants of the provisional applications are Ye LI, Jack H. WINTERS and Huaiyu ZENG. The above provisional applications are hereby incorporated by reference including all references cited therein

BACKGROUND OF THE INVENTION

1. Field of Invention

This invention relates to methods and systems using novel timing recovery techniques in wireless systems.

2. Description of Related Art

As digital wireless communication systems such as Enhanced Data Rates for Global Evolution (EDGE) are standardized around the world, the importance of providing clear and cost-effective communication techniques increases. Various obstacles include mitigating the effects of co-channel interference (CCI), which can occur when multiple communication channels use the same frequency spectrum, and inter-symbol interference (ISI), which can occur when transmitted signals travel along several different paths to an intended receiver.

Currently, CCI and ISI can be mitigated using various forms of equalization techniques such as minimum mean square error - decision feedback equalization (MMSE-DFE) and delayed decision feedback sequence estimation (DDFSE). When these equalization techniques are used in conjunction with multiple receive antennas, these equalization techniques can benefit from a complimentary timing recovery procedure that advantageously delays the received signals from each antenna. Unfortunately, for various burst signals, conventional timing recovery procedures do not necessarily optimize spatial-temporal equalization. Accordingly, there is a need for better timing recovery systems and methods.

SUMMARY OF THE INVENTION

In various embodiments, systems and methods are provided to generate symbol delay times. By receiving a communication signal using a plurality of receive devices such as antennas, a set of respective communication channels can be characterized. The characterized channels can be then used to determine sets of forward-time delays and time-reverse delays using a minimum-mean-square-error technique. By selecting the delay value that produces the lowest mean-square-error in an equalizer, symbol estimation can be improved as compared to a system that only estimates delays in a single temporal direction.

BRIEF DESCRIPTION OF THE DRAWINGS

The invention is described in detail with regard to the following figures, wherein like numerals reference like elements, and wherein:

Figure 5:
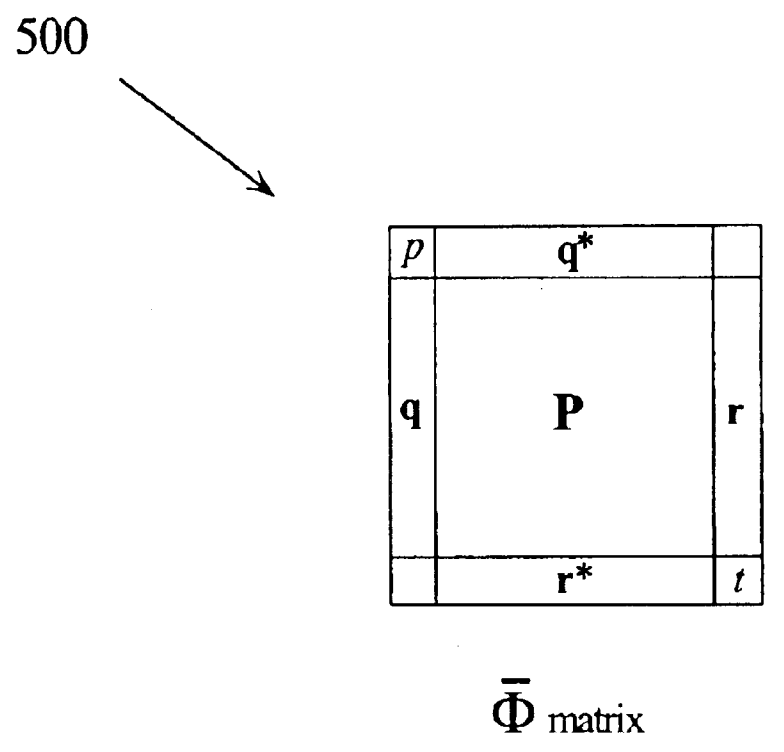

FIG. 5 is a block diagram of an exemplary timing recovery device according to the present invention;

DETAILED DESCRIPTION OF PREFERRED EMBODIMENTS

Various communication obstacles such as co-channel interference (CCI) and inter-symbol interference (ISI) can be mitigated using various forms of equalization techniques such as minimum mean square error - decision feedback equalization (MMSE-DFE) and delayed decision feedback sequence estimation (DDFSE). When these equalization techniques are used in conjunction with multiple receive antennas, these equalization techniques can benefit from a complimentary timing recovery procedure such that the received signals from each antenna are advantageously delayed.

For various communication signals such as burst signals that contain a finite number of embedded symbols, it is well known that a receiver can equalize and estimate the embedded symbols in either a forward or reverse time direction. However, conventional receivers that use timing recovery do not optimize for errors by taking into account both the forward-time and time-reverse modes. That is, receivers using conventional timing recovery approaches do not optimize their delays based on both temporal-direction as well as delay value.

However, by determining the minimum mean square error (MMSE) for an equalizer in both a forward-time and time-reverse direction, the temporal direction as well as the appropriate channel delays for the selected temporal direction can be optimized.

Figure 1:
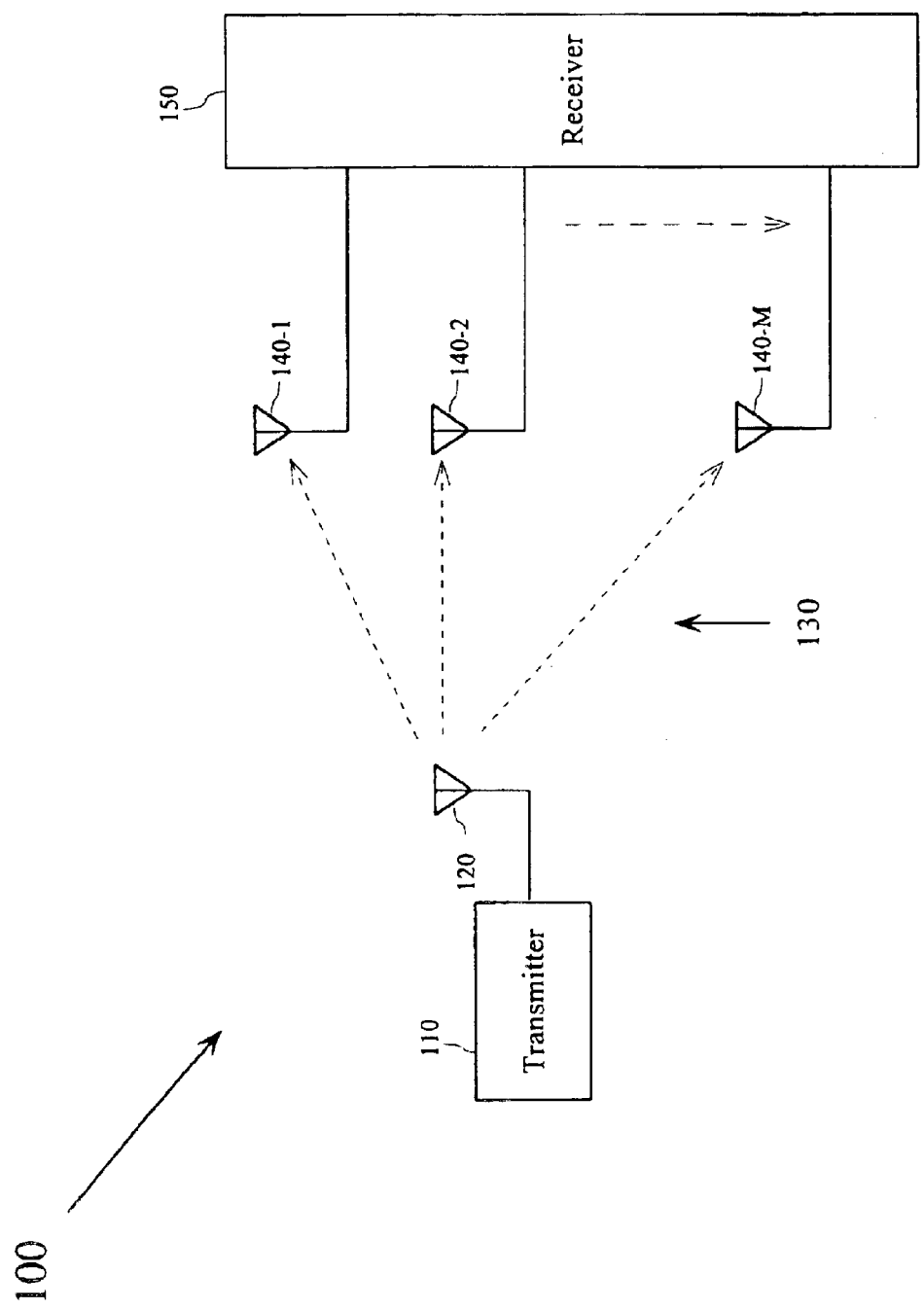
FIG. 1 is a block diagram of an exemplary communication system.

FIG. 1 is an exemplary block diagram of a communication system 100. The communication system 100 includes a transmitter 110 with a transmit antenna 120, a transmission medium 130 and a receiver 150 with a number of receive antennas 140-1, 140-2, . . . , 140-M. In operation, the transmitter 110 can transmit a communication signal using the transmit antenna 120 through the transmission medium 130. Accordingly, the communication signal can be received by each the various receive antennas 140-1, 140-2, . . . , 140-M and provided to the receiver 150.

The transmitter 110 is typically a wireless transmitter transmitting radio signals. However, the transmitter 110 can be any one of a number of different sources such as a wireless transmitter, a transmission system employing wires such as a twisted wire pair, a transmitter adapted for transmitting across coaxial cable, an optical transmitter, a fiber-optic transmitter, a sonic transmitter or any other known or later developed device suitable for transmitting digital symbol information.

As shown in FIG. 1, as the communication signal is transmitted, separate images of the communication signal can be subsequently received by each of the receive antennas 140-1, 140-2, . . . , 140-M through separate communication channels. While FIG. 1 depicts the various communication channels as single direct paths between the transmit antenna 120 and each receive antenna 140-1, 140-2, . . . , 140-M, it should be appreciated that separate images of the communication signal can propagate from the transmit antenna 120 to each receive antenna 140-1, 140-2, . . . , 140-M not only along a direct path, but also propagate from the transmit antenna 120 to each receive antenna 140-1, 140-2, . . . , 140-M along a variety of indirect paths (not shown).

Once the receiver 150 receives the communication signals, the receiver 150 can equalize the communication signals, extract symbol information from the equalized communication signals and provide the extracted information to an external device (not shown). The exemplary receiver 150 can use using a variety of equalization approaches such as DFE, MMSE-DFE, DDFSE and the like. Furthermore, as discussed above, the receiver 150 can use a timing recovery technique to compliment equalization. That is, as the various images of the communication signal are received by the various receive antennas 140-1, 140-2, . . . , 140-M, the received communication signal images can be delayed in a manner such that information can be more accurately extracted as compared to other receivers that do not use variable delays and timing recovery techniques.

Figure 2:
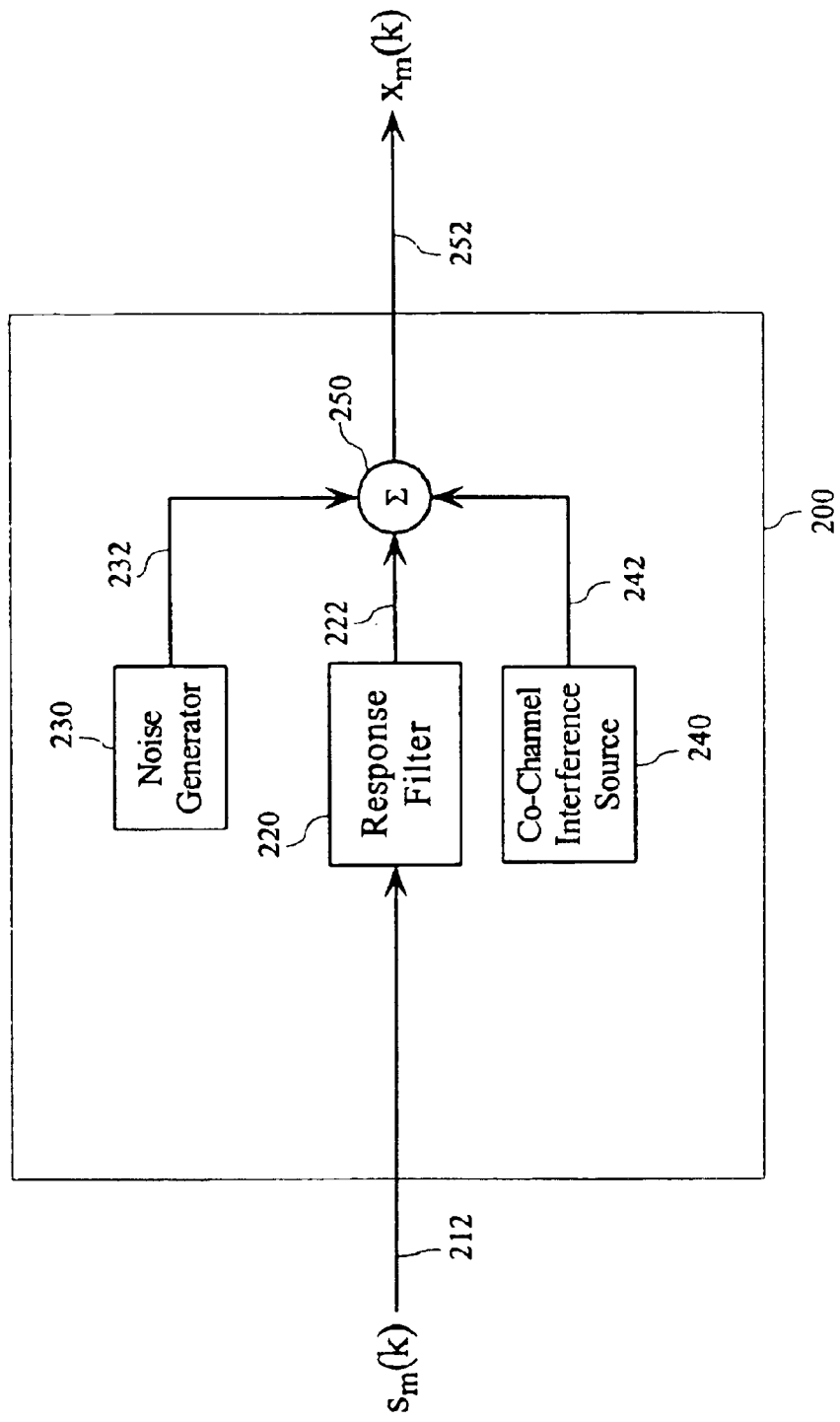
FIG. 2 is a block diagram of an exemplary communication channel model.

FIG. 2 is a block diagram of an exemplary model of a communication channel 200. The communication channel 200 includes a response filter 220, a noise generator 230, a co-channel interference source 240 and an adding junction 250. In operation, the communication channel 200 can receive a communication signal $s_m(k)$ via link 212, process the received signal according to the characteristics of the response filter 220, and provide the processed signal to the adding junction 250 via link 222. Simultaneously, adding junction 250 can receive noise signals from the noise generator 230 via link 232, receive co-channel interference signals from the co-channel interference source 240 via link 242, add the filtered, co-channel and noise signals and provide the added signals to an external device such as a receiver.

A transfer function, or impulse response function, is a mathematical construction that can describe the manner in which a particular communication channel will affect an input signal. In the present example, a communication channel transfer function can be described by Eq (1):

$$x_m(k) = \sum_{i=-L}^{L} h_m(i)s(k-i) + n_m(k) \qquad (1)$$

where $\{h_m(i); i=-L, \ldots, L\}$ is the impulse response for the m-th path of the communication signal, s(k) is the k-th transmitted, or desired, symbol and $n_m(k)$ is the k-th sample of the interference plus noise for the m-th path.

Figure 3:
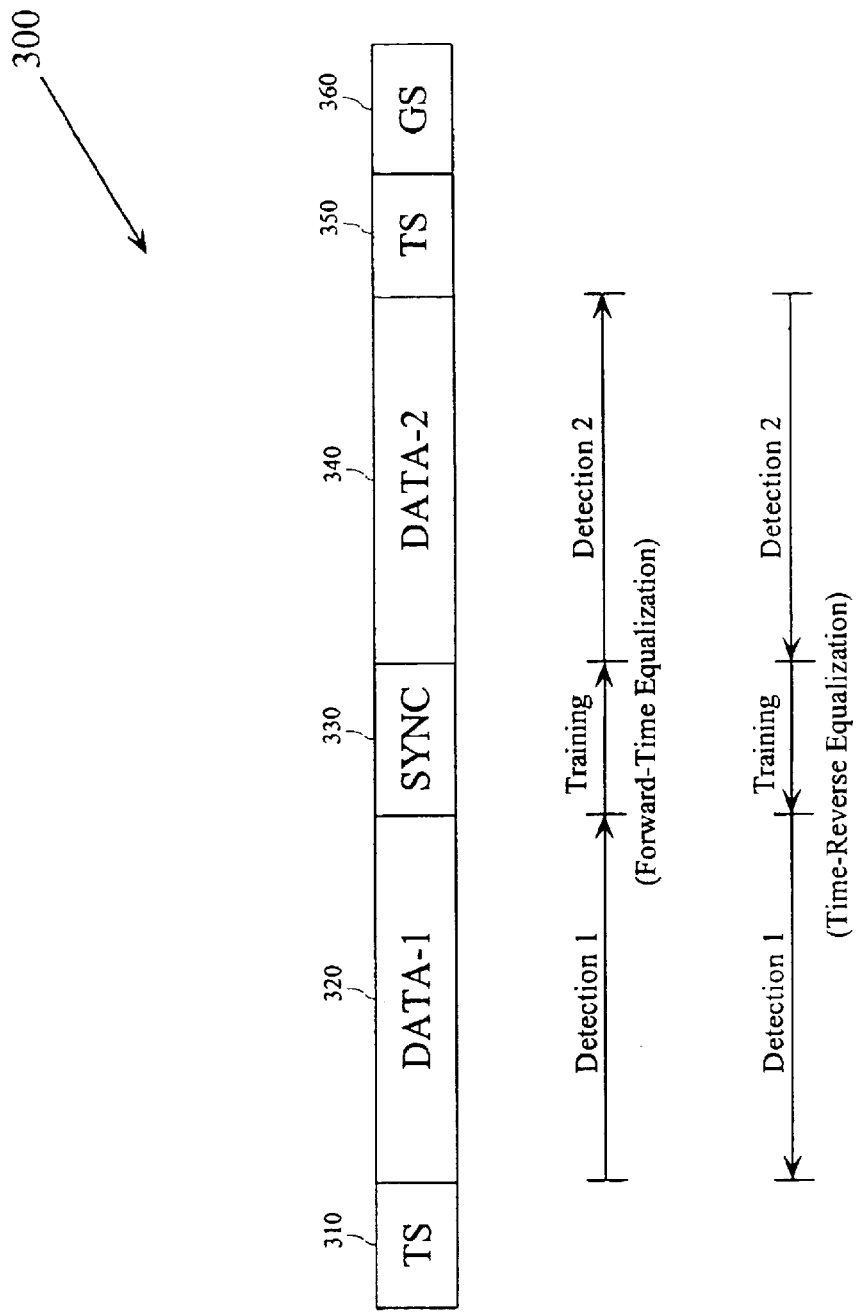
FIG. 3 illustrates an exemplary communication signal.

FIG. 3 depicts an exemplary communication signal 300. As shown in FIG. 3, the communication signal 300 contains a number of first tail symbols 310, a number of first data symbols 320, a number of sync symbols 330, a number of second data symbols 340, a number of second tail symbols 350 and a number of guard symbols 360.

Data symbols, also known as payload symbols, can contain information to be transmitted. Tail symbols are symbols that result when data is convolutionally encoded and can enable information embedded in the data symbols to be smoothly decoded. Guard symbols are symbols that can pad either or both of the beginning and end of a burst transmission and can be used for a variety of purposes including providing buffering, timing and synchronization.

Sync symbols, also know as training symbols, are predetermined symbols placed at various strategic positions within a communication signal that can allow a receiver to synchronize or otherwise extract timing information from a transmitted signal as well as enable an equalizer to estimate a given communication channel. It should be appreciated that, in various exemplary embodiments, the sync symbols 330 can be any set of symbols suitable for training an equalizer and/or timing recovery device. For example, the exemplary sync symbols 330 can be formed taking into account various factors such as their suitability for clock recovery, frequency-shift estimation, their peak-to-average ratio of signal strength or any other known or later recognized factor useful for generating an advantageous or otherwise adequate training sequence.

As shown in FIG. 3, the sync symbols 330 are positioned at the middle of the communication signal 300. During operation, an equalizer operating on the sync symbols 330 can estimate the channel characteristics of the whole of the communication signal 300 in both a forward-time and time-reverse temporal direction. That is, in a forward-time mode, an equalizer can estimate a forward-time, or normal, impulse response using the sync symbols 330. Conversely, an equalizer operating in a time-reverse mode can estimate a time-reversed impulse response using the same sync symbols 330.

When operating in a forward-time mode, the first and second data symbols 320 and 340 can be processed from the leftmost symbol in the first data symbols 320 to the rightmost symbol in the first data symbols 320, and then processed from the leftmost symbol in the second data symbols 340 to the rightmost symbol in the second data symbols 340. Conversely, when operating in a time-reverse mode, the first and second data symbols 320 and 340 can be processed from the rightmost symbol in the second data symbols 340 to the leftmost symbol in the second data symbols 340, and then processed from the rightmost symbol in the first data symbols 320 to the leftmost symbol in the first data symbols 320.

While, at first blush, there may appear to be little difference in choosing a temporal direction, it should be appreciated that, because an impulse response can be non-symmetric, the temporal direction of the equalizer can significantly affect its performance. For example, if an impulse response consists of a first strong path followed by a weak second path, an equalizer such as a DFE operating in a forward-time mode will use the strong first path to cancel the ISI caused by the weak second path. However, if the same DFE operates in the time-reversed mode, the DFE will use the weak second path to cancel the ISI caused by the strong first path. As a result, noise in the communication signal will be enhanced and cause an increased bit-error-rate (BER).

Figure 4:
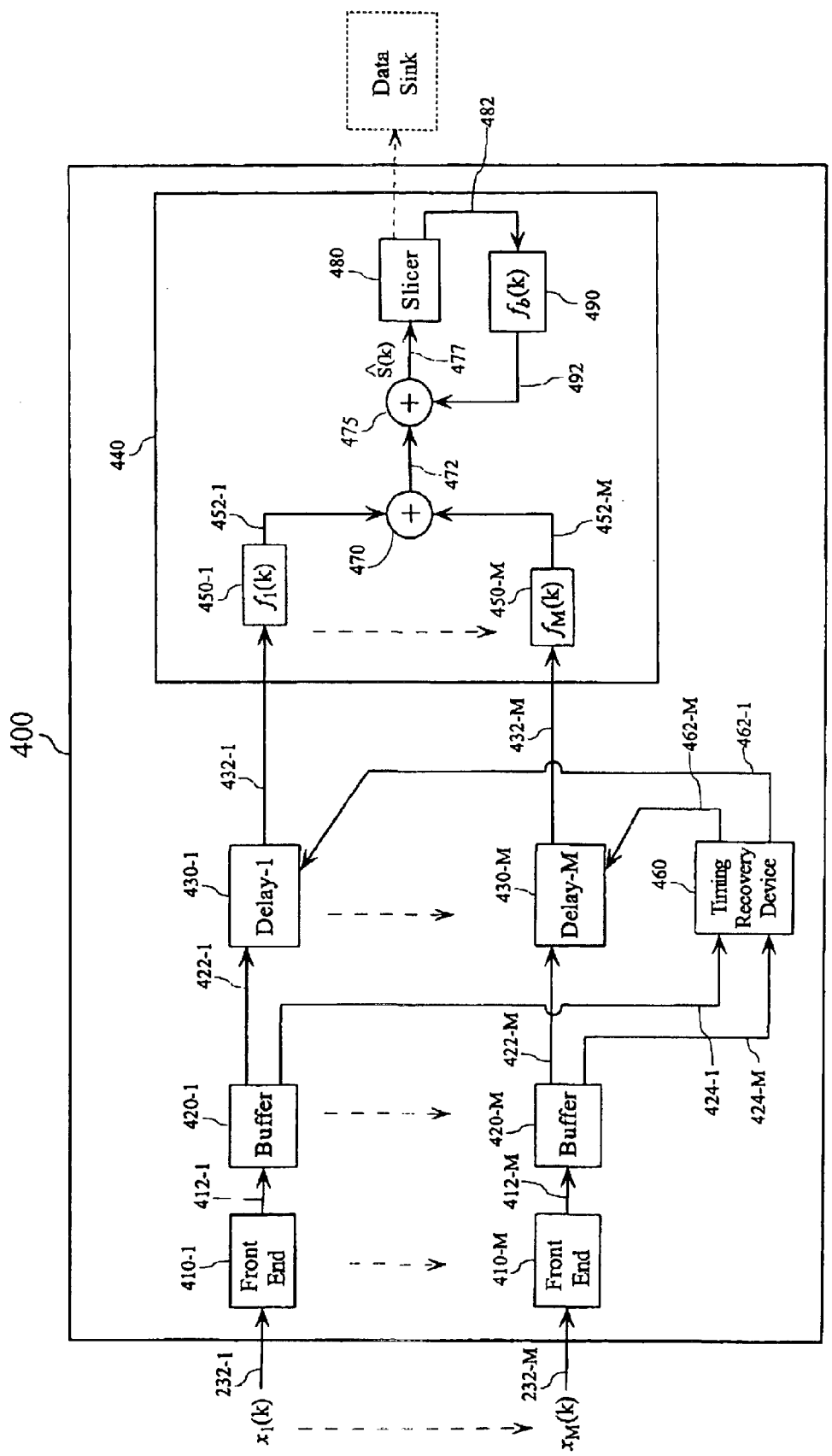
FIG. 4 is a block diagram of an exemplary receiver according to the present invention.

FIG. 4 is a block diagram of an exemplary receiver 400 according to the present invention. As shown in FIG. 4, the exemplary receiver 400 contains a number of front-ends 410-1, . . . , 410-M, a number of buffers 420-1, . . . , 420-M, a number of delay devices 430-1, . . . , 430-M, a timing recovery device 460, and an equalizer 440 containing a number of feed-forward filters 450-1, . . . , 450-M, a first adding junction 470, a second adding junction 475, a slicer 480 and a feedback filter 490.

In operation, various images $x_1(k), \ldots, x_m(k)$ of a communication signal can be received by the various front-ends 410-1, . . . , 410-M via links 232-1, . . . , 232-M. The exemplary front-ends 410-1, . . . , 410-M can perform various processes on the communication signals such as frequency shifting/demodulating, automatic gain control and converting the processed communication signals to digital form. After the front-ends 410-1, . . . , 410-M have digitized the communication signals, the digitized communication signals can then be passed to the buffers 420-1, ..., 420-M via links 412-1, ..., 412-M where the buffers 420-1, ..., 420-M can store the digitized communication signals, pass the digitized communication signals to the timing recovery device 460 via links 424-1, ..., 424-M, and further pass the digitized communication signals to the delay devices 430-1, ..., 430-M via the links 432-1, ..., 432-M.

After the timing recovery device 460 receives the digitized communication signals, the timing recovery device 460 can determine various sets of feed-forward coefficients $f_1(k), \ldots, f_M(k)$ and feedback coefficients $f_b(k)$ for the equalizer 440, provide the feed-forward coefficients $f_1(k), \ldots, f_M(k)$ to the feed-forward filters 450-1, ..., 450-M and provide the feedback coefficients $f_b(k)$ to the feedback filter 490.

The timing recovery device 460 can also determine a number of delay values and provide the delay values to the various delay devices 430-1, ..., 430-M via links 462-1, ..., 462-M. As discussed above, equalizers can operate in either a forward-time and time-reverse operation. For the exemplary receiver 400, the timing recover device 460 can determine which of the forward-time or time-reverse temporal directions will provide better performance for the receiver 400 and provide the better performing delay value to the delay devices 430-1, ..., 430-M.

If the timing recovery device 460 provides a forward-time delay value to the delay devices 430-1, ..., 430-M, the buffers 420-1, ..., 420-M can then provide the digitized communication signals to their respective delay devices 430-1, ..., 430-M. The delay devices 430-1, ..., 430-M can then apply their respective delays to the digitized communication signals, temporally vary the digitized communication signals and provide the delayed communication signals to the feed-forward filters 450-1, ..., 450-M.

The feed-forward filters 450-1, ..., 450-M can then filter their respective signals and provide the filtered signals to the first adding junction 470 via links 452-1, ..., 452-M. The first adding junction 470 can add the filtered signals and provide the added filtered signals to the second adding junction 475 via link 472. The second adding junction 475 can then combine the added filtered signals with a feedback signal received from the feedback filter 490 via link 492, and provide the combined signals to the slicer 480. The slicer 480 can operate on the combined signals to estimate a number of symbols, which can be fed back to the feedback filter 490 via link 482, as well as provide symbol estimates to an external device.

If the timing recovery device 460 provides a time-reverse delay value, as opposed to forward-time delay value, to the delay devices 430-1, ..., 430-M, the buffers 420-1, ..., 420-M can similarly provide the digitized communication signals to their respective delay devices 430-1, ..., 430-M. However, because the symbols in the communication signal are to-be estimated in a time-reverse mode, the buffers 420-1, ..., 420-M can provide the digitized communication signals to their respective delay devices 430-1, ..., 430-M in reverse order. The reverse-order communication signals can then be fed to the equalizer 440, which can operate on the reverse-order communication signal as it would normal-time signals with the exception that the values in the feed-forward filters 450-1, ..., 450-M and feedback filter 490 can be tailored taking into account the time-reversed temporal direction.

As discussed above, the exemplary equalizer 440 can operate according to a MMSE-DFE technique. However, it should be appreciated that the equalizer 440 can alternatively operate according to any other equalizer paradigm such as a DDFSE, an advanced DDFSE (ADDFSE) or other equalization technique capable of operating according to a MMSE approach.

Given the channel model of FIG. 2 and the receiver of FIG. 4, the input of the slicer can be given by Eq. (2):

$$\hat{s}(k) = \sum_{m=1}^{M} \sum_{i=0}^{L_f} f_m^*(i) x_m(k - d + L_f - i) - \sum_{i=1}^{L_b} f_b^*(i) s(k - i) \quad (2)$$

where d is the equalizer delay, s(k) is the k-th symbol and ( ) denotes a complex-conjugate transpose. Using vector representation, Eq. (1) can be rewritten to the form of Eq. (3):

$$x(k) = Hs(k) + n(k) \quad (3)$$

where:

$$x(k) \triangleq \begin{pmatrix} x_1(k - d + L_f) \\ \vdots \\ x_1(k - d) \\ \vdots \\ x_M(k - d + L_f) \\ \vdots \\ x_M(k - d) \end{pmatrix}, \quad (4)$$

$$n(k) \triangleq \begin{pmatrix} n_1(k - d + L_f) \\ \vdots \\ n_1(k - d) \\ \vdots \\ n_M(k - d + L_f) \\ \vdots \\ n_M(k - d) \end{pmatrix}, \quad (5)$$

$$s(k) \triangleq \begin{pmatrix} s(k - d + L_f + \bar{L}) \\ \vdots \\ s(k) \\ \vdots \\ s(k - d - L) \end{pmatrix} \quad \text{and} \quad (6)$$

$$H \triangleq \begin{pmatrix} h_1(-\bar{L}) & \cdots & h_1(-L) & 0 \\ & \ddots & & \ddots \\ 0 & & h_1(-\bar{L}) & \cdots & h_1(-L) \\ & & \vdots & \\ h_1(-\bar{L}) & \cdots & h_1(-L) & 0 \\ & \ddots & & \ddots \\ 0 & & h_1(-\bar{L}) & & h_1(-L) \end{pmatrix}. \quad (7)$$

For convenience, the set feed-forward coefficients for the various feed-forward filters 450-1, ..., 450-M and the feedback coefficients for the feedback filter 490 can be described by Eqs. (8) and (9) respectively:

$$f = [f_1(0), \ldots, f_1(L_f), \ldots, f_M(1), \ldots, f_M(L_b)]^T, \text{ and} \quad (8)$$

$$b = [\underbrace{0, \ldots, \ldots, 0}_{-d+L_f+L}, 1, \underbrace{f_b(1), \ldots, f_b(L_b)}_{f_b^T}, \underbrace{0, \ldots, \ldots, 0}_{d+L-L_b}]^T. \quad (9)$$

The error in the slicer input can then be described by Eq. (10):

$$e(k) = \hat{s}(k) - s(k) = f^* x(k) - b^* s(k)^T \quad (10)$$

To derive the optimal feed-forward filter values, x(k) and b*s(k) can be considered as an input and desired signal, respectively, and the MSE of the equalizer 440 can be given by Eq. (11):

$$MSE = b^* \underbrace{(I - H*(HH^* + R_{nn})^{-1}H)}_{\hat{\Phi}} b, \text{ or} \quad (11)$$

$$MSE = b^* \hat{\Phi} b, \quad (12)$$

where $$\hat{\Phi} = (I - H^*(HH^* + R_{nn})^{-1} H), \text{ and} \quad (13)$$

$$R_{nm} \triangleq E\{n(k)n(k)^*\}, \text{ or alternatively} \quad (14)$$

$$\hat{R}_{nn} = \frac{1}{N} \sum_{k=1}^{N} (x(k) - \hat{H}s(k))(x(k) - \hat{H}s(k))^* \quad (15)$$

where $R_{nm}$ is noise-covariance matrix, $\hat{R}_{nm}$ is the noise-covariance matrix estimate, s(k) is the k-th sync symbol and the noise in the various symbols in a transmitted communication are assumed to be uncorrelated, i.e., $E\{n(k)n(k)^*\} = I$.

The $\hat{\Phi}$ matrix of Eqs. (11)–(13) is a $(L+\overline{L}+L_f+1)$-by-$(L+\overline{L}+L_f+1)$ square matrix. From the $\hat{\Phi}$ matrix, a composite matrix $\Phi$ can be derived by extracting a $(L_b+2)$-by-$(L_b+2)$ sub-block from the $\hat{\Phi}$ matrix whose upper-left-hand element, i.e., $\Phi[1,1]$, is the $(-d+\overline{L}+L_f+1)$-th diagonal element of the $\hat{\Phi}$ matrix.

FIG. (5) depicts the structure of the composite matrix $\Phi$ of Eq. (13). As shown by FIG. (5), the composite matrix $\Phi$ is an $(L_b+2)$-by-$(L_b+2)$ array of elements that can be conceptually divided into seven separate elements/arrays; p, t, q, q*, r, r* and P where;

$$p \triangleq \Phi[1, 1], \quad (16)$$

$$t \triangleq \Phi[(L_b+2), (L_b+2)], \quad (17)$$

$$q \triangleq \{\Phi[1, 2], \Phi[1, 3], \ldots, \Phi[1, (L_b+2)-1]\}^T, \quad (18)$$

$$q^* \triangleq \{\Phi[2, 1], \Phi[3, 1], \ldots, \Phi[(L_b+2), 1]\}, \quad (19)$$

$$r \triangleq \{\Phi[2, (L_b+2)], \Phi[3, (L_b+2)], \ldots, \Phi[(L_b+2), (L_b+2)-1]\}^T, \quad (20)$$

$$r^* \triangleq \{\Phi[(L_b+2), 2], \Phi[(L_b+2), 3], \ldots, \Phi[(L_b+2), (L_b+2)-1]\} \text{ and} \quad (21)$$

$$P \triangleq \begin{bmatrix} \Phi[2, 2] & \cdots & \Phi[2, (Lb+2)-1] \\ \vdots & \ddots & \vdots \\ \Phi[(Lb+2)-1, 2] & \cdots & \Phi[(Lb+2)-1, (Lb+2)-1] \end{bmatrix} \quad (22)$$

For an equalizer with a variable delay d, the respective forward-time MSE value for delay d and the respective MMSE value for delay d can be calculated by Eqs. (23) and (24) respectively:

$$MSE(d) = (p - q^* P^{-1} q) + (f_b - P^{-1} q)^* P(f_b - P^{-1} q) \quad (23)$$

$$MMSE(d) = p - q^* P^{-1} q \quad (24)$$

The optimum forward-time delay $\vec{d}$ is the delay value that minimizes the MMSE(d) according to Eq. (24). Accordingly, by judiciously testing various values within the range $L_b+1-L>d>L_f+\overline{L}$ and calculating the various MMSE (d) values within the selected range, the optimum forward-time delay $\vec{d}$ can be determined.

Besides the optimum forward-time delay $\vec{d}$, the optimum time-reverse delay can also be calculated. To derive the optimum time-reverse delay, it is useful to define the time-reverse impulse response, which can be given by Eq. (25):

$$\overline{x}_m(k) = \sum_{i=-L}^{\overline{L}} \overline{h}_m(i)\overline{s}(k-1) + \overline{n}_m(k) \quad (25)$$

where the overbar implies a time-reverse system. To derive the MSE for a time-reverse system, it can be convenient to derive the transform of Eq. (26):

$$J \triangleq \begin{pmatrix} 0 & & 1 \\ & \cdot^{\cdot^{\cdot}} & \\ 1 & & 0 \end{pmatrix} \quad (26)$$

For a given matrix A, JA flips the rows of A from top to bottom. Similarly, AJ flips the columns from left to right. Accordingly, it can be shown that $\overline{H} = JHJ$, $\overline{R}_{nm} = JR_{nm}J$ and $\overline{\Phi} = J\Phi J$. By choosing $\overline{d} = (L_f+L_b+1)-d$, it can be further shown that $\overline{P} = JPJ$, $\overline{p} = t$ and $\overline{q} = Jr$. For an equalizer with a variable delay, the respective time-reverse MSE value for a given delay $\overline{d}$ and the respective time-reverse MMSE value for delay $\overline{d}$ can be calculated by Eqs. (27)–(28) and (29)–(30) respectively:

$$\overline{MSE}(\overline{d}) = (\overline{p} - \overline{q}^* \overline{P}^{-1} \overline{q}) + (f_b \overline{P}^{-1} \overline{q})^* \overline{P}(f_b \overline{P}^{-1} \overline{q}) \text{ or} \quad (27)$$

$$\overline{MSE}(\overline{d}) = (t - r^* P^{-1} r) + (f_b J P^{-1} r)^* P(f_b - P^{-1} r), \text{ and} \quad (28)$$

$$\overline{MMSE}(\overline{d}) = \overline{p} - \overline{q}^* \overline{P}^{-1} \overline{q}, \text{ or} \quad (29)$$

$$\overline{MMSE}(\overline{d}) = t - r^* P^{-1} r \quad (30)$$

The optimum time-reversed delay $\overline{d}$ is the delay value that minimizes the $\overline{MMSE}(\overline{d})$ according to Eq. (30). Accordingly, by testing for various delay values within the range $L_b+1-L>\overline{d}>L_f+\overline{L}$ and calculating the $\overline{MMSE}(\overline{d})$ for the various delay values within the selected range, the optimum time-reversed delay $\overline{d}$ value can be determined.

As shown by Eqs. (16)–(30), both forward-time and time-reverse delays can be derived using the same composite matrix $\Phi$. By using a composite matrix $\Phi$, the processing power and time required to derive forward-time and time-reverse delays and their MMSE values is greatly reduced as compared to systems that did not share such common resources.

Figure 6:
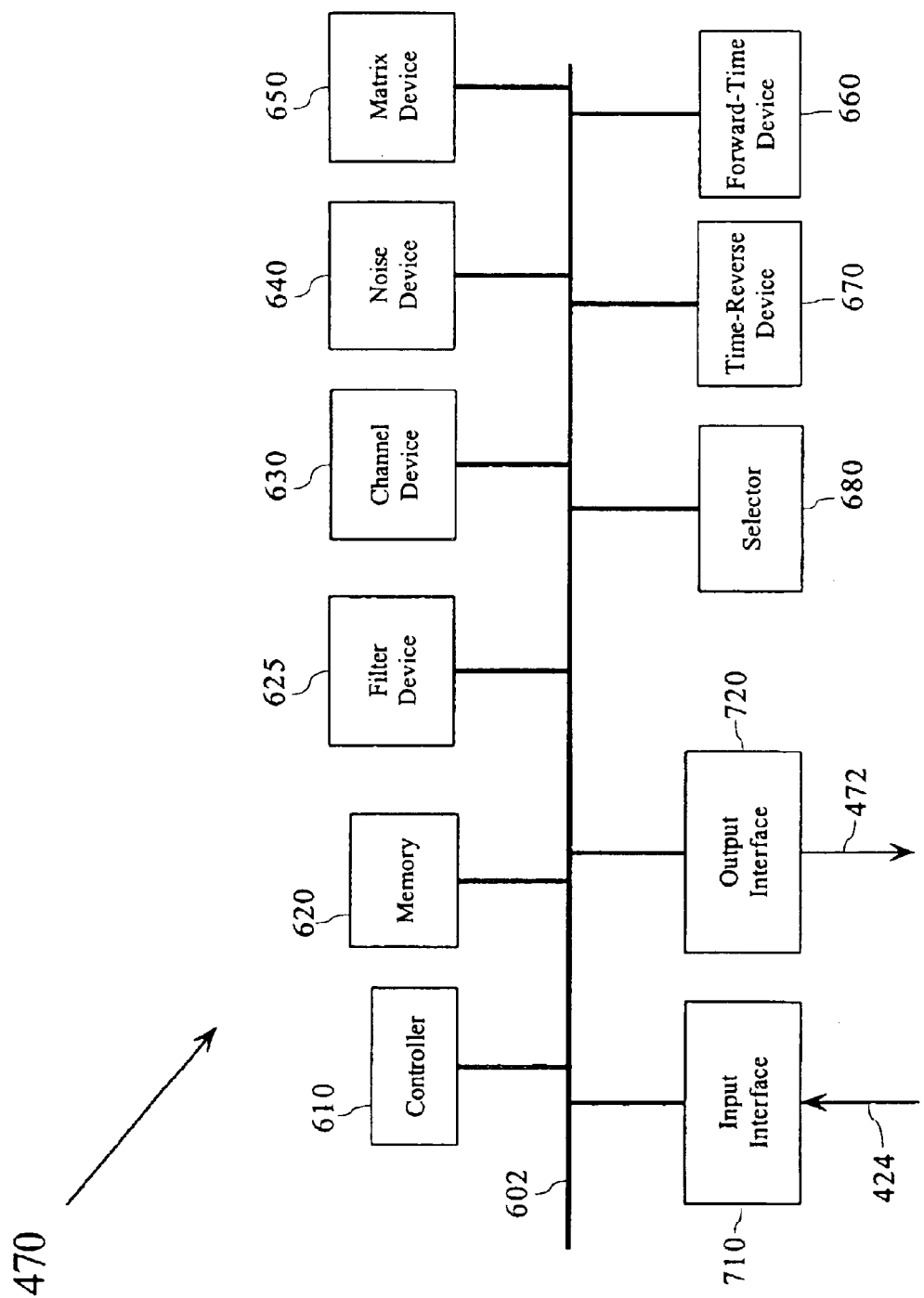
FIG. 6 depicts a composite matrix according to the present invention.

FIG. 6 is a block diagram of an exemplary timing recovery device 470 with a controller 610, a memory 620, a filter device 625, a channel device 630, a noise device 640, a matrix device 650, a forward-time device 660, a time-reverse device, a selector 680, an input interface 710 and an output interface 720. The controller 610 interfaces with the other components 620–720 using a control/data bus 602. Although the exemplary timing recovery device 470 uses a bussed architecture, it should be appreciated that the exemplary timing recovery device 470 can use any known or later developed architecture such as an array of electronic circuits such as a combination of PALs, PDAs, FPGAs and the like.

Under control of the controller 610, the input interface 710 can receive various images of a communication signal composed of streams of guard, tail, data and sync symbols via link 424, and store the communication signal images in the memory 620. As the communication signal images are received and stored, the controller 610 can subsequently provide the communication signal images to the filter device 625.

The filter device 625 can receive the communication signal images and determine variousDFE feed-forward and feedback filter coefficients. While the exemplary DFE filter coefficients are determined according to an MMSE approach, it should be appreciated that the filter device 625 can determine feed-forward and feedback filter coefficients using any combination of known or later developed techniques that can form filtering elements based on an MMSE approach can be used without departing from the spirit and scope of the present invention.

Next, the controller 610 can provide the communication signal images stored in the memory 620 to the channel device 630. The channel device 630 can receive the various communication signal images, characterize the communication channels for each respective communication image and form a channel matrix according to Eq. (7) above using a number of sync symbols embedded in the communication signal images. In various embodiments, the exemplary communication channels can be characterized according to a cross-correlation technique or a least-squares technique. However, it should be appreciated that any known or later developed technique capable of characterizing communication channels can be used without departing from the spirit and scope of the present invention.

Once the channel matrix is determined, the controller 610 can transfer the channel matrix to the noise device 640, and further provide the communication signal images stored in the memory 620 to the noise device 640. The noise device 640 can then derive a noise-covariance matrix according to Eqs. (13) or (14) above. However, it should be appreciated that any combination of known or later developed techniques capable of determining noise covariance can be used without departing from the spirit and scope of the present invention. Once the noise-covariance matrix is determined, the noise-covariance matrix can be provided to the matrix device 650 along with the channel matrix and various feed-forward and feed-back filters.

The matrix device 650 can receive the channel matrix, noise-covariance matrix and filter coefficients and then form a composite matrix $\Phi$ such as that depicted in FIG. (5). While the exemplary matrix device 650 determines the composite matrix $\Phi$ matrix according to Eq. (11), any known or later developed technique capable of producing a composite matrix $\Phi$ or its equivalent information can be used without departing from the spirit and scope of the present invention. Once the composite matrix $\Phi$ is formed, the matrix device 650 can provide the composite matrix $\Phi$ to the forward-time device 660 and to the time-reverse device 670.

The forward-time device 660 can receive the composite matrix $\Phi$ and determine an optimum forward-time delay. To determine the optimum forward-time delay, the forward-time device 660 first determines a preliminary forward-time delay value. The prelirnnary forward-time delay value can be determined by selecting various values within the range $L_b+1-L>d>L_f+\overline{L}$ and determining the respective MMSE(d) values according to Eq. (24) above. Next, the forward-time device 660 determines the optimum, i.e., most advantageous, delay by selecting the forward-time delay with the lowest MMSE(d) value.

As with the forward-time device 660, the time-reverse device 670 can receive the composite matrix $\Phi$ and determine an optimum time-reverse delay. To determine the optimum time-reverse delay, the time-reverse device 670 first determines a preliminary time-reverse delay value. The preliminary time-reverse delays can be determined by selecting various values within the range $L_b+1-L>d>L_f+\overline{L}$ and determining the respective $\overline{\text{MMSE}}(d)$ values using Eqs. (29) or (30) above. Next, the time-reverse device 670 determines the optimum, i.e., most advantageous, time-reverse delay by selecting the time-reverse delay with the lowest $\overline{\text{MMSE}}(d)$ value.

The exemplary forward-time device 660 and time-reverse device 670 determine their forward-time and time-reverse delays based on a common composite matrix $\Phi$. By using a common composite matrix $\Phi$, the processing power and time required to derive forward-time and time-reverse delays and their respective MMSE values ares greatly reduced as compared to systems that did not share such common resources. However, it should be appreciated that the exemplary forward-time device 660 and time-reverse device 670 can determine their respective forward-time and time-reverse delays using any combination known or later developed techniques without departing from the spirit and scope of the present invention.

Next, the forward-time device 660 and time-reverse device 670 provide their optimum delay and respective MMSE values to the selector 680. The selector 680 can receive the optimum forward-time and time-reverse delays and respective MMSE values, compare the MMSE values and select the delay that provides the better MMSE value. The selector can then export the selected delay along with an indicator as to the selected delay's temporal value to a number of external devices via the output interface 720 and link 472.

Figure 7:
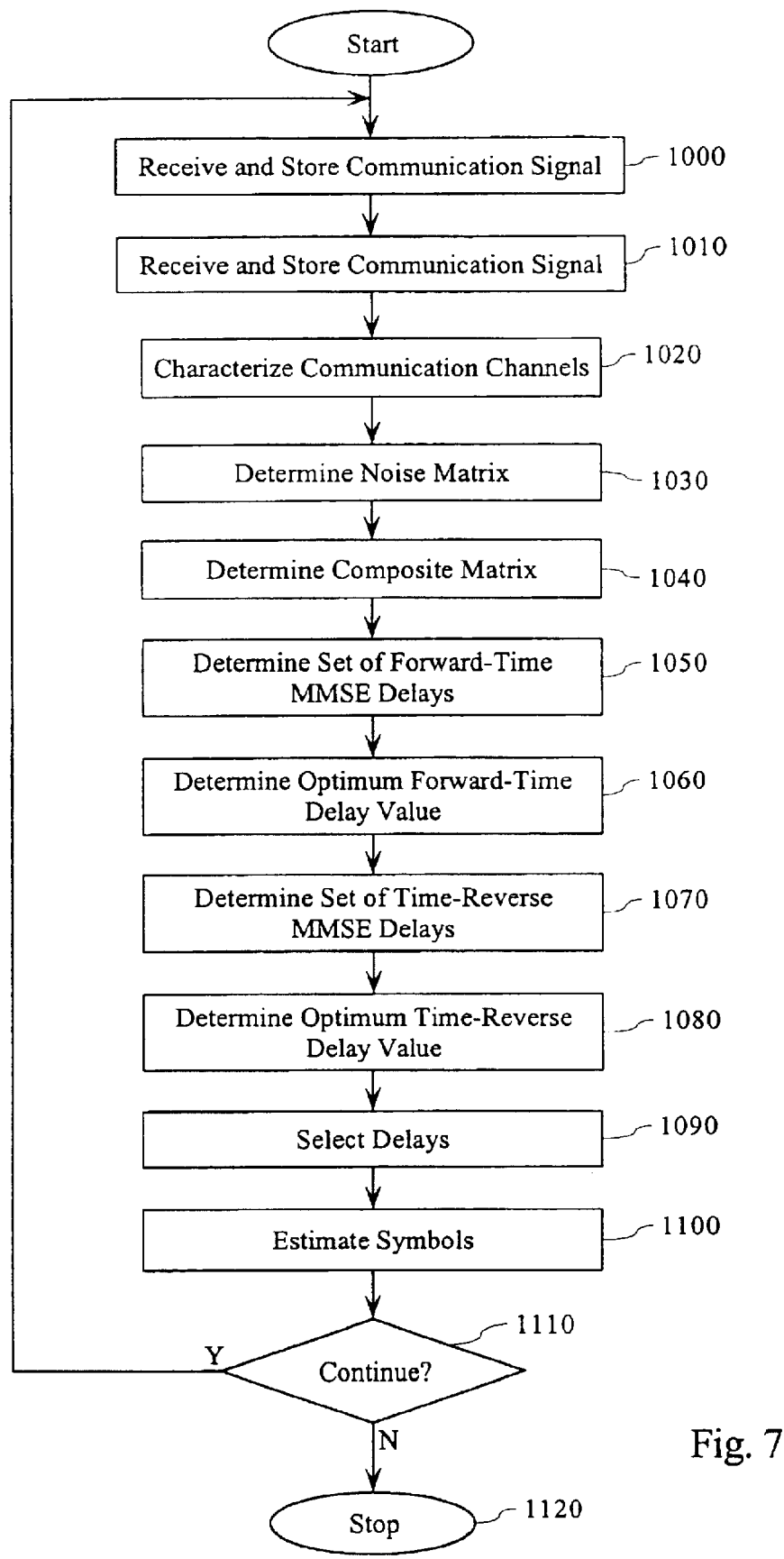
FIG. 7 is a flowchart outlining an exemplary operation of a timing recovery technique according to the present invention.

FIG. 7 is a flowchart outlining an exemplary technique for timing recovery in a receiver according to the present invention. The process starts in step 1000 where a communication signal is received by a plurality of receive devices such as antennas. As discussed above, the received communication signal can contain a desired signal such as a burst of various tail, guard, data and sync symbols as well as various interference and noise signals. The process continues to step 1010.

In step 1010, a set of DFE feed-forward and feedback filter coefficients are determined. While the exemplary DFE filter coefficients are determined based on an MMSE approach, it should be appreciated that any combination of known or later developed techniques that can form filtering elements based on an MMSE approach can be used without departing from the spirit and scope of the present invention. The process continues to step 1020.

In step 1020, each communication channel for each respective antenna can be characterized to form a channel matrix according to Eq. (7) above using a number of sync symbols. In various embodiments, the exemplary communication channels can be characterized according to a cross-correlation technique or a least-squares technique. However, it should be appreciated that any known or later developed technique capable of characterizing communication channels can be used without departing from the spirit and scope of the present invention. The process continues to step 1030.

In step 1030, a noise-covariance matrix is determined based on the noise received by each antenna. The exemplary noise-covariance matrix can be determined based on Eqs. (13) or (14) above. However, any combination of known or later developed techniques capable of determining noise covariance can be used without departing from the spirit and scope of the present invention. The process continues to step 1040.

In step 1040, a composite matrix D such as that depicted in FIG. (5) is determined. While the exemplary techniques determines the composite matrix Φ matrix according to Eq. (11), any known or later developed technique capable of producing a composite matrix Φ matrix or its equivalent information can be used without departing from the spirit and scope of the present invention. The process continues to step 1050.

In step 1050, a preliminary set of forward-time delay values is determined based on the composite matrix Φ. As discussed above, the preliminary forward-time delays can be determined by selecting various values within the range $L_b+1-L>d>L_f+\overline{L}$ and calculating the respective MMSE(d) values according to Eq. (24) above. Next, in step 1060, the optimum, i.e., most advantageous, forward-time delay is determined by selecting the forward-time delay with the lowest MMSE(d) value. The process continues to step 1070.

In step 1070, a preliminary set of time-reverse delay values is determined based on the composite matrix Φ. As with the forward-time delays, the preliminary time-reverse delays can be determined by selecting various values within the range $L_b+1-L>d>L_f+\overline{L}$ and calculating their respective $\overline{MMSE(d)}$ values using Eqs. (29) or (30) above. Next, in step 1080, the optimum time-reverse delay is determined by selecting the time-reverse delay with the lowest $\overline{MMSE(d)}$ value.

As discussed above, the exemplary forward-time and time-reverse delays are determined based on a common composite matrix Φ. Again, by using a common composite matrix Φ, the processing power and time required to derive forward-time and time-reverse delays and their respective MMSE values ares greatly reduced as compared to systems that did not share such common resources. The process continues to step 1090.

In step 1090, the MMSE values for the optimum forward-time and time-reverse delays is compared and the delay that provides the better MMSE value is selected. Next, in step 1100, the symbols in the communication signal received in step 1010 are estimated using the selected delays. As discussed above, the exemplary estimation technique can estimate symbols using a DFE, DDFSE or ADDFSE technique. However, the particular equalization technique can vary and can include any combination of known or later developed equalization approaches without departing from the spirit and scope of the present invention. The process continues to step 1100.

In step 1110, a determination is made whether to continue to receive further communication signals. If further communication signals are to be received, control jumps back to step 1010 where a next communication signal is received; otherwise, control continues to step 1120 where the process stops.

As shown in FIGS. 1–6, the systems and methods of this invention are preferably implemented on a digital signal processor (DSP) or other integrated circuits. However, the systems and methods can also be implemented using any combination of one or more general purpose computers, special purpose computers, program microprocessors or microcontroller and peripheral integrating circuit elements, hardware electronic or logic circuits such as application specific integrated circuits (ASICs), discrete element circuits, programmable logic devices such as PLAs, FPGAs, PALs or the like. In general, any device on which exists a finite state machine capable of implementing the various elements of FIGS. 1–6 and the flowchart of FIG. 7 can be used to implement the training sequence functions.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A method for communicating, comprising:
   characterizing a set of two or more communication channels;
   determining a forward-time delay value based on the communication channels and based on a common composite matrix;
   determining a time-reverse delay value based on the received communication signal and based on the common composite matrix;
   selecting one of the forward-time delay value and the time-reverse delay value; and
   equalizing a received signal based on the selected delay value.

2. The method of claim 1, wherein the forward-time delay is determined based on a minimum-mean-square-error technique.

3. The method of claim 2, wherein the time-reversed delay is determined based on a minimum-mean-square-error technique.

4. The method of claim 3, wherein the selected delay has a smaller mean-square-error than the other delay.

5. The method of claim 1, further comprising estimating a number of symbols based on the selected delay.

6. The method of claim 5, wherein the estimated symbols are estimated based on a decision-feedback-estimation (DFE) technique.

7. The method of claim 6, wherein the detected symbols are estimated based on a minimum-mean-square-error-decision-feedback-estimation (MMSE-DFE) technique.

8. The method of claim 5, wherein the estimated symbols are estimated based on an advanced delayed decision feedback sequence estimation (ADDFSE) technique.

9. The method of claim 2, wherein the received signal is received using a plurality of receive devices.

10. The method of claim 9, wherein at least a first portion of the received signal received by a first receive device is delayed using the selected delay.

11. A communication device, comprising:
    a channel estimation device that characterizes a set of two or more communication channels;
    a forward-time device that determines a set of one or more forward-time delays based on the set of communication channels and a common composite matrix;
    a time-reverse device that determines a set of one or more time-reverse delays based on the set of communication channels and the common composite matrix; and
    a selector that selects one of the set of forward-time delays and the set of time-reverse delays to produce a set of selected delays.

12. The device of claim 11, wherein the set of forward-time delays is determined based on a minimum-mean-square-error technique.

13. The device of claim 12, wherein the set of time-reverse delays is determined based on a minimum-mean-square-error technique.

14. The device of claim 13, wherein the set of selected delays has a smaller mean-square-error than the other set of delays.

15. The device of claim 11, further comprising an equalizer that estimates a number of symbols based on the selected set of delays.

16. The device of claim 15, wherein the estimated symbols are estimated based on a decision-feedback-estimation (DFE) technique.

17. The device of claim 16, wherein the detected symbols are estimated based on a minimum-mean-square-error-decision-feedback-estimation (MMSE-DFE) technique.

18. The device of claim 15, wherein the estimated symbols are estimated based on an advanced delayed decision feedback sequence estimation (ADDFSE) technique.

19. The device of claim 11, further comprising a plurality of receive devices.

20. The device of claim 19, wherein a first portion of a received signal received by a first antenna is delayed relative to a second portion of the received signal received by a second antenna.

* * * * *